No. 682,309. Patented Sept. 10, 1901.
J. ZBORNIK.
FERTILIZER DISTRIBUTER.
(Application filed Oct. 24, 1900.)

(No Model.) 2 Sheets—Sheet 1.

WITNESSES:
D. B. Waunluser Jr.
M. D. Lewis.

INVENTOR
John Zbornik
BY
Hey & Parsons
ATTORNEYS

THE NORRIS PETERS CO., PHOTO-LITHO., WASHINGTON, D. C.

No. 682,309. Patented Sept. 10, 1901.
J. ZBORNIK.
FERTILIZER DISTRIBUTER.
(Application filed Oct. 24, 1900.)
(No Model.) 2 Sheets—Sheet 2.
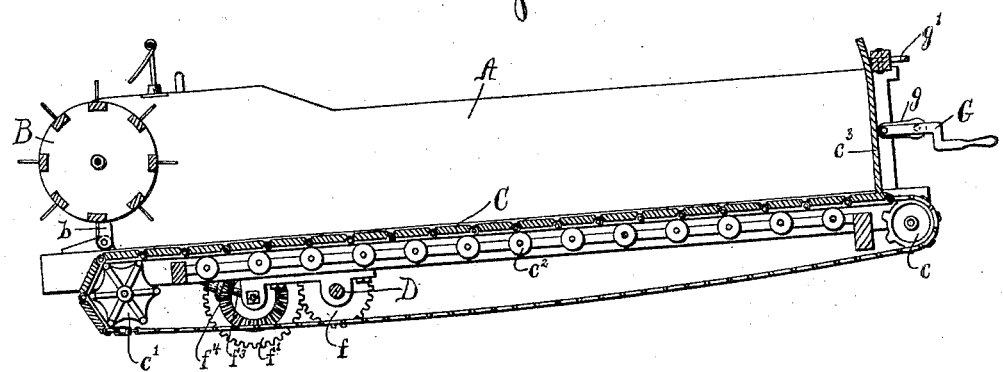
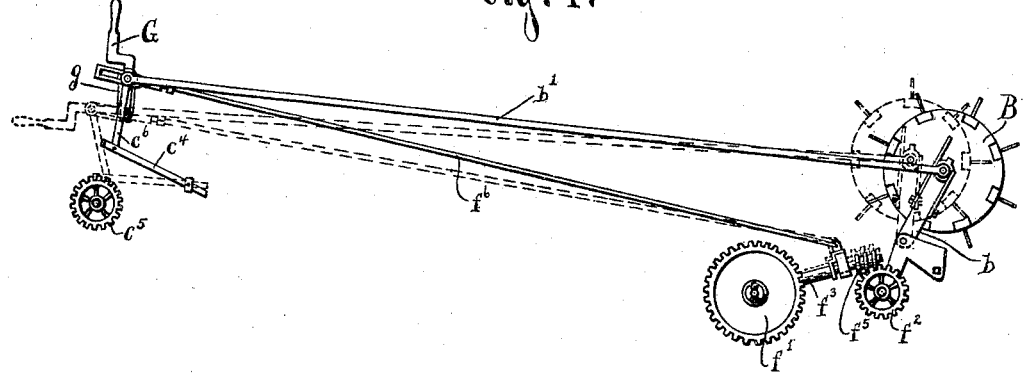
WITNESSES:
INVENTOR
John Zbornik
BY
ATTORNEYS

UNITED STATES PATENT OFFICE.

JOHN ZBORNIK, OF FORT ATKINSON, IOWA, ASSIGNOR TO KEMP & BURPEE MANUFACTURING COMPANY, OF SYRACUSE, NEW YORK.

FERTILIZER-DISTRIBUTER.

SPECIFICATION forming part of Letters Patent No. 682,309, dated September 10, 1901.

Application filed October 24, 1900. Serial No. 34,169. (No model.)

*To all whom it may concern:*

Be it known that I, JOHN ZBORNIK, of Fort Atkinson, in the county of Winneshiek, in the State of Iowa, have invented certain new and useful Improvements in Fertilizer-Distributers, of which the following is a specification.

My invention relates to improvements in fertilizer-distributers, has for its object the production of means for preventing breakage and injury of the discharging devices for the fertilizer and the power-transmitting mechanisms which actuate said discharging devices, and consists in the combinations and constructions hereinafter described and claimed.

Figure 1:
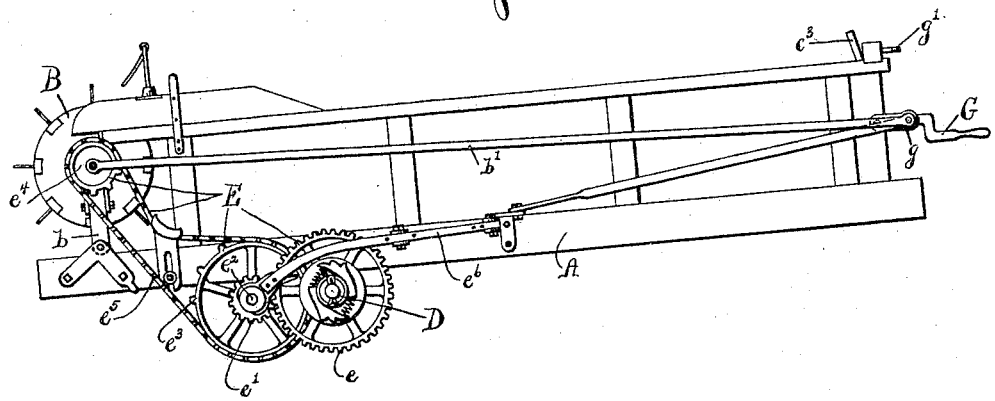
Figure 2:
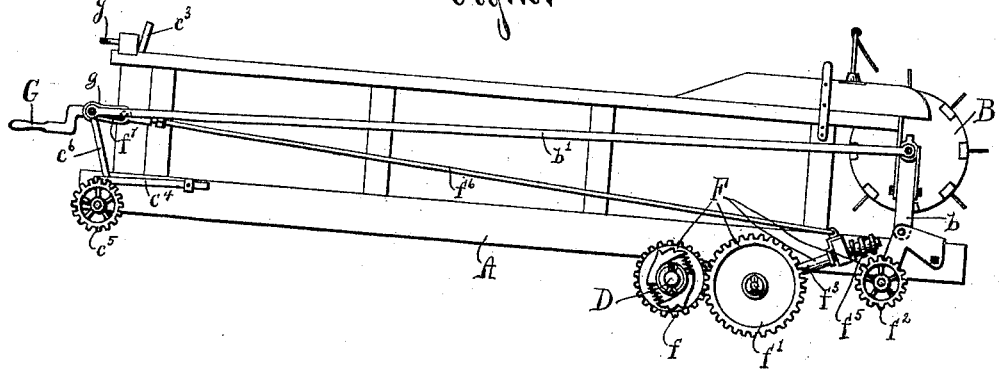

Figures 1 and 2 are opposite side elevations of a portion of a fertilizer-distributer embodying my invention, the movable parts being shown in the positions assumed when the fertilizer is not being discharged. Fig. 3 is a longitudinal vertical section of the parts seen in Figs. 1 and 2. Fig. 4 is an elevation of the detached discharging device, a portion of the power-transmitting mechanism for operating the feeding device, the actuating member, and the connections between said discharging device, power-transmitting mechanism, and actuating member.

In the practical use of a certain well-known type of fertilizer-distributer provided with a discharging device for the fertilizer and a feeding device for supporting the load of fertilizer and supplying the same to the discharging device there is more or less liability of breakage and injury of the parts, and particularly of the discharging device and its power-transmitting mechanism, when said device commences its operation, since the fertilizer is more or less densely packed against the discharging device and retards its action to a greater extent than when the machine is in full operation. Such breakage and injury is generally avoided by moving the entire load of fertilizer a limited distance forwardly or away from the discharging device before said discharging device commences its operation. In order to effect said movement of the load of fertilizer, the draft-animals attached to the machine are stopped and the operator dismounts and moves the feeding device and its superimposed load a limited distance forwardly toward the draft-animals or away from the discharging device by means of a crank or other movable part connected to said feeding device and actuated by the operator without assistance from the draft-animals. In some cases spreaders of this type have been provided with end pieces or boards movable between the discharging device and the fertilizer and secured to long rods or links, by which the end pieces or boards are withdrawn before the operation of the discharging device and are held above the load of fertilizer during said operation. These end pieces or boards are more or less objectionable, are unsightly when elevated above the fertilizer, and as the machine moves over the field said pieces or boards tend to move in many directions and subject their long supporting rods or links to great strain.

In my improved fertilizer-distributer breakage of the discharging device and its power-transmitting mechanism is avoided by moving said device a comparatively short distance backwardly from the contiguous portion of the fertilizer just before or as the discharging device commences its operation, and this result is effected easily and by the operation of the actuating member which controls the transmission of power to said discharging and feeding devices.

My fertilizer-distributer comprises a receptacle A for the fertilizer, a device B for discharging the fertilizer, a device C for feeding the fertilizer to the device B, a driving-shaft D, power-transmitting mechanisms E F, connected, respectively, to said discharging and feeding devices and to the driving-shaft, and an actuating member G for moving the discharging device B backwardly from the contiguous portion of the fertilizer and for controlling the transmission of power by the mechanisms E F.

The receptacle A is of any suitable form, size, and construction, is mounted on any desirable supporting-wheels, (not illustrated,) and is shown as having its rear end and its bottom open.

In the preferable construction of my invention the discharging device B is arranged to form a closure for the open rear end of the receptacle A, and consists of a revoluble frame which is held at rest when the fertilizer is not being discharged, is provided with projecting teeth, and is journaled in separated movable upright supports $b$, formed with journal-openings in their upper ends for receiving trunnions for the discharging device B and pivoted at their lower ends to the rear end of the receptacle A. Said discharging device B is connected to the actuating member G, presently described, by links $b'$, arranged on opposite sides of the receptacle A and having their rear ends pivoted to the trunnions for the device B or to the upper ends of the supports $b$ and their front ends pivoted to crank-arms $g$, movable with the member G.

The feeding device C forms a closure for the open bottom of the receptacle A and is of any suitable form, size, and construction, being here shown as an endless belt running over an idler $c$, a driving-wheel $c'$, and rollers $c^2$ and as provided with an upright end board $c^3$. Said feeding device C is connected to the actuating member G by a toothed wheel $c^4$ on the shaft for the idler $c$, a stop-lever $c^5$, having one end pivoted to the receptacle A and its other end movable into engagement with the toothed wheel $c^4$, and a link $c^6$, pivoted to one of the cranks $g$ and to the stop-lever $c^5$. When the stop-lever $c^5$ is in operative position in engagement with the toothed wheel $c^4$, the movement of the feeding device C is prevented.

The driving-shaft D is suitably supported by the receptacle A or the running-gear of the fertilizer-distributer. Said shaft is actuated by one or more of the supporting-wheels (not illustrated) for the distributer, being here shown as provided with clutch-dogs, which are engaged with said wheels when moving forwardly.

As best seen in Fig. 1, the power-transmitting mechanism E consists of a gear $e$, fixed to the driving-shaft D, a second gear $e'$, movable lengthwise of a stationary shaft $e^2$ and meshing with the gear $e$, a sprocket-wheel $e^3$, mounted on the shaft $e^2$, a clutch (not illustrated) for connecting the gear $e'$, and the sprocket-wheel $e^3$ when the gear $e'$ is moved endwise toward the sprocket-wheel $e^3$, a sprocket-wheel $e^4$, fixed to the discharging device B, and a chain $e^5$, connecting the wheels $e^3$ $e^4$. Said mechanism E is connected to the actuating member G by a lever $e^6$, pivoted to the receptacle A and having one end connected to the gear $e'$ for moving the same endwise and its other end connected to one of the cranks $g$ by suitable means unnecessary to describe herein. The clutch (not illustrated) between the gear $e'$ and the sprocket-wheel $e^3$ controls the transmission of power to the discharging device B, and the lever $e^6$ for moving the gear $e'$ endwise forces said clutch into and out of operative position and is operated by the actuating member G.

The power-transmitting mechanism F, which is best shown in Figs. 2, 3, and 4, consists of a gear $f$, fixed to the driving-shaft D, a disk gear $f'$, meshing with the gear $f$, a worm-wheel $f^2$, fixed to the shaft for the driving-wheel $c'$, and a movable shaft $f^3$, having one end pivoted to the shaft for the disk wheel $f'$ and provided with a bevel-pinion $f^4$, meshing with said wheel $f'$, and its opposite end provided with a worm $f^5$, movable vertically into and out of engagement with the worm-wheel $f^2$. The mechanism F is connected to the actuating member G by a link $f^6$, having one end pivoted to a collar on the vertically-moving end of the shaft $f^3$ and its other end connected to one of the crank-arms $g$. Said crank-arm connected to the link $f^6$ is generally provided with a lateral extension movable in a lengthwise slot in the link $f^6$ against a spring $f^7$, which is arranged in said slot and is compressed by the movement of the crank-arm before the link $f^6$ commences to transmit motion from said crank-arm to the worm $f^5$. Consequently the worm $f^5$ is not engaged with the worm-wheel $f^2$ until after the commencement of the movement of the discharging device B. The movable worm $f^5$ and the connections including the link $f^6$ from said worm to the actuating member G form means which controls the transmission of power to the feeding device and is operated by the actuating member G.

The actuating member G preferably consists of a rocking lever connected to the parts B C E F, as previously described, and fixed to a rock-shaft journaled in the front end of the receptacle A and provided at its ends with the crank-arms $g$, previously mentioned, which form, essentially, parts of the member G. As clearly seen in the drawings, said actuating member is normally arranged in a substantially horizontal plane and is locked in an upright position by a suitable catch $g'$.

In the use of a fertilizer-distributer embodying my invention the fertilizer is loaded within the receptacle A, while the actuating member G remains in its horizontal position, the distributer is drawn to the place for the discharge of the fertilizer, and the operator without leaving his seat raises the free end of the actuating member G and engages the same with the catch $g'$. As said member G is rocked upwardly the discharging device is moved backwardly from the contiguous portion of the fertilizer, the stop-lever $c^5$ is withdrawn from engagement with the wheel $c^4$, the mechanism E is caused to transmit rotary motion to said discharging device, and the mechanism F is operated to actuate the feeding device to supply the fertilizer to the device B. When the entire load of fertilizer or any predetermined part thereof is discharged, the member G may be returned to its normal depressed position, whereupon the discharging device will be moved toward the front of the receptacle, the stop-lever $c^5$ will be engaged with the wheel $c^4$, and the transmission of motion to the discharging and feeding devices will be prevented.

My fertilizer-distributer will now be readily understood upon reference to the foregoing description and the accompanying drawings, and it will be particularly noted that I do not herein limit myself to the construction and arrangement of the discharging and feeding devices or the power-transmitting mechanisms for actuating these devices, since said parts may be more or less varied without departing from the spirit of my invention.

Having thus fully described my invention, what I claim as new, and desire to secure by Letters Patent, is—

1. In a fertilizer-distributer, the combination of a receptacle for the fertilizer, a discharging device, said device being movable for discharging the fertilizer and being at rest when not discharging the fertilizer, power-transmitting mechanism for actuating the discharging device, and means for moving the discharging device from the contiguous portion of the fertilizer and thereby preventing breakage of the parts when said device commences its operation, substantially as and for the purpose described.

2. In a fertilizer-distributer, the combination of a receptacle for the fertilizer, a revoluble discharging device, said device being revoluble for discharging the fertilizer and being at rest when not discharging the fertilizer, means for moving the discharging device from the contiguous portion of the fertilizer, and power-transmitting means for rotating the discharging device, substantially as and for the purpose specified.

3. In a fertilizer-distributer, the combination of a receptacle for the fertilizer, said receptacle having one end open, a discharging device arranged to form a closure for the open end of the receptacle, said device being movable for discharging the fertilizer and being at rest when not discharging the fertilizer, power-transmitting mechanism for actuating the discharging device, and means for moving the discharging device from the contiguous portion of the fertilizer and thereby preventing breakage of the parts when said device commences its operation, substantially as and for the purpose set forth.

4. In a fertilizer-distributer, the combination of a receptacle for the fertilizer, a discharging device, said device being movable for discharging the fertilizer and being at rest when not discharging the fertilizer, power-transmitting mechanism for actuating the discharging device, and an actuating member supported by the receptacle and connected to the discharging device for moving the same from the contiguous portion of the fertilizer and thereby preventing breakage of the parts when said device commences its operation, substantially as and for the purpose described.

5. In a fertilizer-distributer, the combination of a receptacle for the fertilizer, said receptacle having one end open, a discharging device arranged to form a closure for the open end of the receptacle, said device being movable for discharging the fertilizer and being at rest when not discharging the fertilizer, power-transmitting mechanism for actuating the discharging device, and an actuating member supported in proximity to the opposite end of the receptacle and connected to the discharging device for moving the same from the contiguous portion of the fertilizer and thereby preventing breakage of the parts when said device commences its operation, substantially as and for the purpose specified.

6. In a fertilizer-distributer, the combination of a receptacle for the fertilizer, a discharging device, said device being movable for discharging the fertilizer and being at rest when not discharging the fertilizer, a movable support for the discharging device, a rocking actuating member supported by the receptacle, and a link connected to the support and to the actuating member, substantially as and for the purpose set forth.

7. In a fertilizer-distributer, the combination of a receptacle for the fertilizer, separated supports pivoted to one end of the receptacle, a discharging device journaled in the supports, said device being movable for discharging the fertilizer and being at rest when not discharging the fertilizer, a rocking actuating member supported by the opposite end of the receptacle, and links arranged on opposite sides of the receptacle and connected to the supports and to the actuating member, substantially as and for the purpose described.

8. In a fertilizer-distributer, the combination of a receptacle for the fertilizer, a discharging device for the fertilizer, a driving-shaft, power-transmitting mechanism connecting the discharging device and the driving-shaft and provided with a clutch for controlling the transmission of power to the discharging device, and an actuating member connected to the discharging device for moving the same from the contiguous portion of the fertilizer and thereby preventing breakage of the parts when said discharging device commences its operation, said actuating member being also connected to the clutch for operating the same, substantially as and for the purpose specified.

9. In a fertilizer-distributer, the combination of a receptacle for the fertilizer, a discharging device for the fertilizer, a feeding device for supplying the fertilizer to the discharging device, a driving-shaft, power-transmitting mechanism connecting the feeding device and the driving-shaft and provided with means for controlling the transmission of power to the feeding device, and an actuating member connected to the discharging device for moving the same from the contiguous portion of the fertilizer and thereby preventing breakage of the parts when said discharging device commences its operation, said actuating member being also connected to said means of the power-transmitting mechanism for operating the same, substantially as and for the purpose specified.

10. In a fertilizer-distributer, the combination of a receptacle for the fertilizer, a discharging device for the fertilizer, a feeding device for supplying the fertilizer to the discharging device, a driving-shaft, power-transmitting mechanism connecting the discharging device and the driving-shaft and provided with a clutch for controlling the transmission of power to the discharging device, a second power-transmitting mechanism connecting the feeding device and the driving-shaft and provided with means for controlling the transmission of power to the feeding device, and an actuating member connected to the discharging device for moving the same from the contiguous portion of the fertilizer and thereby preventing breakage of the parts when said discharging device commences its operation, said actuating member being also connected to the clutch of the first power-transmitting mechanism and to said means of the second power-transmitting mechanism for operating said clutch and means, substantially as and for the purpose set forth.

11. In a fertilizer-distributer, the combination of a receptacle for the fertilizer, a discharging device for the fertilizer, power-transmitting mechanism for actuating the discharging device, a feeding device for supplying the fertilizer to the discharging device, means for preventing the operation of the feeding device, and an actuating member connected to the discharging device, for moving the same from the contiguous portion of the fertilizer and thereby preventing breakage of the parts when the discharging device commences its operation, said actuating member being also connected to the means for preventing the operation of the feeding device, substantially as and for the purpose set forth.

In testimony whereof I have hereunto signed my name, in the presence of two attesting witnesses, at Syracuse, in the county of Onondaga and State of New York, this 26th day of February, 1900.

JOHN ZBORNIK.

Witnesses:
 DORA LAIME,
 S. DAVIS.